United States Patent
Ryu et al.

(10) Patent No.: US 8,358,912 B2
(45) Date of Patent: Jan. 22, 2013

(54) METHOD OF SYNCHRONIZING BROADCAST CONTENT BETWEEN BROADCAST RECORDER AND PORTABLE CONTENT PLAYER AND APPARATUS FOR THE SAME

(75) Inventors: Won-ho Ryu, Seoul (KR); Seong-hoon Kang, Suwon-si (KR); Kyoung-gu Woo, Seoul (KR); Dong-hyun Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1438 days.

(21) Appl. No.: 11/524,916

(22) Filed: Sep. 22, 2006

(65) Prior Publication Data

US 2007/0065107 A1 Mar. 22, 2007

(30) Foreign Application Priority Data

Sep. 22, 2005 (KR) .......................... 10-2005-0088353

(51) Int. Cl.
   *H04N 5/76* (2006.01)
   *H04N 5/765* (2006.01)
   *H04N 5/77* (2006.01)
(52) U.S. Cl. ......... 386/291; 386/200; 386/296; 386/362
(58) Field of Classification Search ......................... None
   See application file for complete search history.

(56) References Cited

U.S. PATENT DOCUMENTS

| | | | | |
|---|---|---|---|---|
| 2002/0141737 | A1* | 10/2002 | Fuchigami | 386/98 |
| 2002/0150387 | A1* | 10/2002 | Kunii et al. | 386/83 |
| 2005/0108769 | A1* | 5/2005 | Arnold et al. | 725/115 |
| 2006/0140584 | A1* | 6/2006 | Ellis et al. | 386/83 |

FOREIGN PATENT DOCUMENTS

| | | |
|---|---|---|
| EP | 1624446 A1 | 2/2006 |
| GB | 2405718 A | 3/2005 |
| JP | 2001-169250 A | 6/2001 |
| JP | 2004-336464 A | 11/2004 |
| KR | 1998-023126 A | 7/1998 |
| KR | 10-1998-0059920 A | 10/1998 |
| KR | 10-2002-0014720 A | 2/2002 |
| WO | 2004/086356 A1 | 10/2004 |
| WO | 2005/029843 A1 | 3/2005 |

* cited by examiner

*Primary Examiner* — William C Vaughn, Jr.
*Assistant Examiner* — Heather Jones
(74) *Attorney, Agent, or Firm* — Sughrue Mion, PLLC

(57) ABSTRACT

A method of synchronizing broadcast contents between a broadcast recorder and a portable content player and an apparatus for the same are disclosed. The broadcast content synchronizing method includes obtaining metadata about broadcast contents stored in a portable content player from the portable content player; confirming a broadcast content that has already been reproduced among the broadcast contents stored in the portable content player by the obtained metadata; retrieving a broadcast content corresponding to the next installment of the confirmed broadcast content from recorded broadcast contents; and storing the retrieved broadcast content in the portable content player.

20 Claims, 9 Drawing Sheets

FIG. 3

| CONTENT INFORMATION 310 | | REPRODUCTION HISTORY INFORMATION 320 | |
|---|---|---|---|
| TITLE | CSI SEASON 3 | NUMBER OF REPRODUCTION TIMES | 1 |
| TOTAL NUMBER OF EPISODES | 24 | LATEST REPRODUCTION DATE AND TIME | 2005-09-22 AM 08:10:10 |
| EPISODE ORDER | 17 | LATEST REPRODUCTION POSITION | 0X01212121 |
| GENRE | SUSPENSE | | |
| TELEVISED DAY OF THE WEEK | FRIDAY | ... | ... |
| AIRDATE | 2005-09-21 | | |
| AIRTIME | PM 10:00-11:00 | | |
| ... | ... | | |

311 TITLE
312 TOTAL NUMBER OF EPISODES
313 EPISODE ORDER
314 GENRE
315 TELEVISED DAY OF THE WEEK
316 AIRDATE
317 AIRTIME
321 NUMBER OF REPRODUCTION TIMES
322 LATEST REPRODUCTION DATE AND TIME
323 LATEST REPRODUCTION POSITION

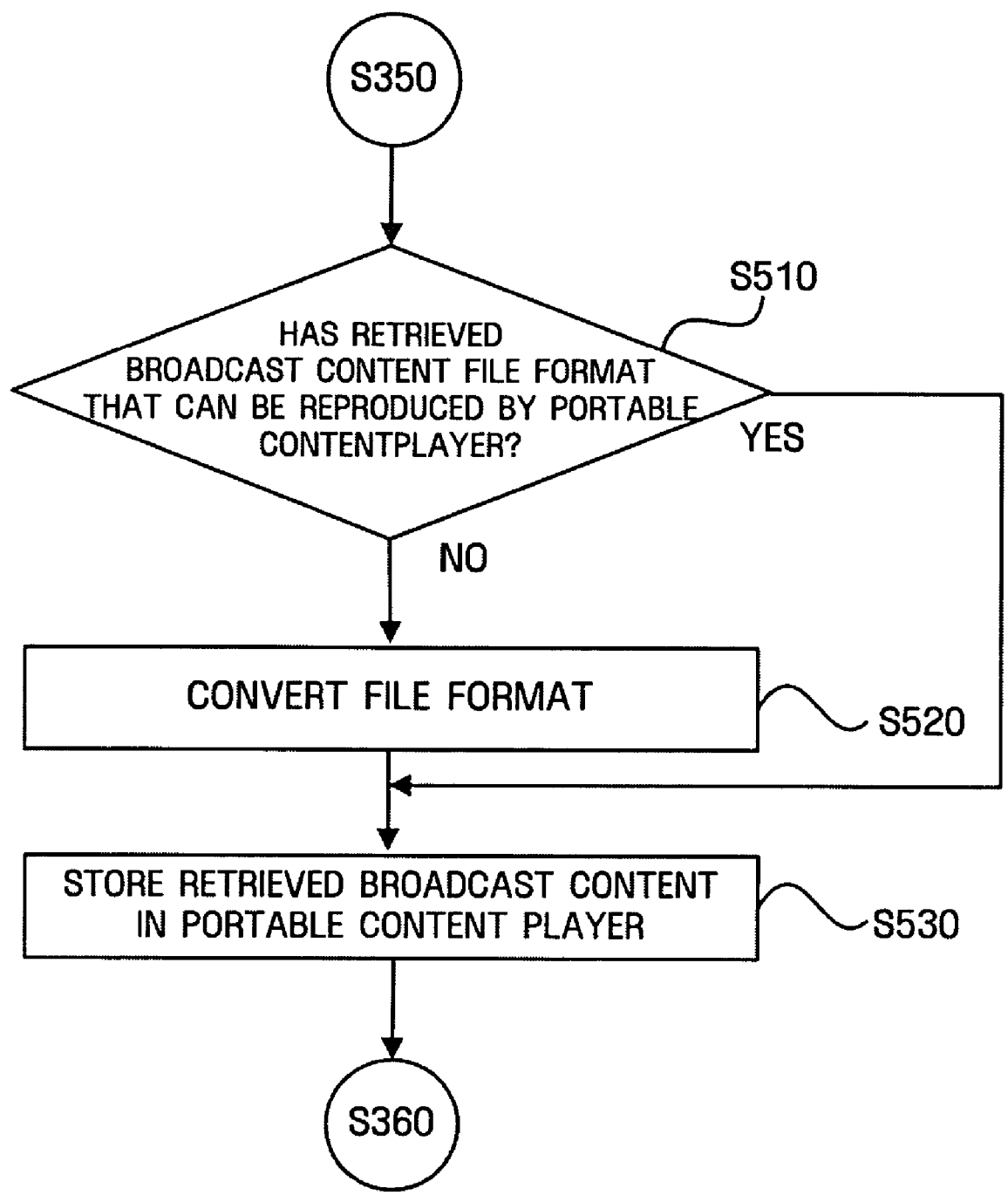

METHOD OF SYNCHRONIZING BROADCAST CONTENT BETWEEN BROADCAST RECORDER AND PORTABLE CONTENT PLAYER AND APPARATUS FOR THE SAME

CROSS-REFERENCE TO RELATED APPLICATIONS

This application claims priority from Korean Patent Application No. 10-2005-0088353 filed on Sep. 22, 2005 in the Korean Intellectual Property Office, the disclosure of which is incorporated herein by reference in its entirety.

BACKGROUND OF THE INVENTION

1. Field of the Invention

The present invention relates to a broadcast content synchronizing method, and more particularly, to a method of synchronizing broadcast contents between a broadcast recorder and a portable content player and to an apparatus for the same.

2. Description of the Related Art

In recent years, portable content players such as PMPs (Portable Multimedia Player) have come into widespread use. A portable content player has a memory where video contents can be stored and has a function of reproducing video contents. Therefore, when a user records broadcast contents provided from a broadcaster by using a broadcast recorder such as a PVR and stores the recorded broadcast contents in a portable content player, the user can watch or listen to the broadcast contents even while moving.

However, in order to store broadcast contents from a broadcast recorder in a portable content player according to the related art, a user needs to manually perform several processes. For example, the user deletes a broadcast content that has already been viewed or listened to from the portable content player, and retrieves a broadcast content corresponding to the next installment of the viewed or listened to broadcast content in the broadcast recorder. At this time, when the broadcast content corresponding to the next installment exists as the retrieval result, the user should store the corresponding broadcast content in the portable content player. When the broadcast content corresponding to the next installment does not exist as the retrieval result, the user should set a timer recording of the corresponding broadcast content.

In particular, when broadcast contents that the user frequently views is a series such as a soap opera, the user should manually retrieve and record a broadcast content and manually store the broadcast content in the portable content player every time as described above, which inconveniences the user.

For this reason, a technique has been required to synchronize broadcast contents between a broadcast recorder and a portable content player in a simpler and easier method.

Even though Korean Unexamined Patent Application Publication No. 1998-023126 (METHOD FOR SETTING SCHEDULED RECORDING OF SERIES IN VCR) discloses a technique of automatically setting a schedule for recording broadcast programs of a series, it does not disclose a technique of automatically synchronizing broadcast contents between a portable content player and a broadcast recorder.

SUMMARY OF THE INVENTION

An aspect of the present invention is to automatically store broadcast contents of a series in a portable content player.

The above stated aspect as well as other aspects, features and advantages, of the present invention will become clear to those skilled in the art upon review of the following description.

According to an aspect of the present invention, there is provided a broadcast content synchronizing method which includes obtaining metadata about broadcast contents stored in a portable content player from the portable content player; confirming a broadcast content that has already been reproduced among the broadcast contents stored in the portable content player by the obtained metadata; retrieving a broadcast content corresponding to the next installment of the confirmed broadcast content from the recorded broadcast contents; and storing the retrieved broadcast content in the portable content player.

According to another aspect of the present invention, there is provided a broadcast recorder which includes a broadcast record module recording broadcast contents; an interface module performing communication with a portable content player; and a content synchronizing module that retrieves, from the recorded broadcast contents, a broadcast content corresponding to the next installment of a broadcast content that has already been reproduced among broadcast contents stored in the portable content player, and stores the retrieved broadcast content in the portable content player.

The details of other examples are included in the below detailed description and the appended drawings.

BRIEF DESCRIPTION OF THE DRAWINGS

The above and other features and advantages of the present invention will become more apparent by describing in detail exemplary embodiments thereof with reference to the attached drawings in which:

FIG. 3 is a view illustrating metadata according to an embodiment of the invention;

FIG. 9 is a flowchart specifically showing the process S355 of storing a broadcast content in a portable content player in FIG. 7.

DETAILED DESCRIPTION OF THE INVENTION

Figure 1:
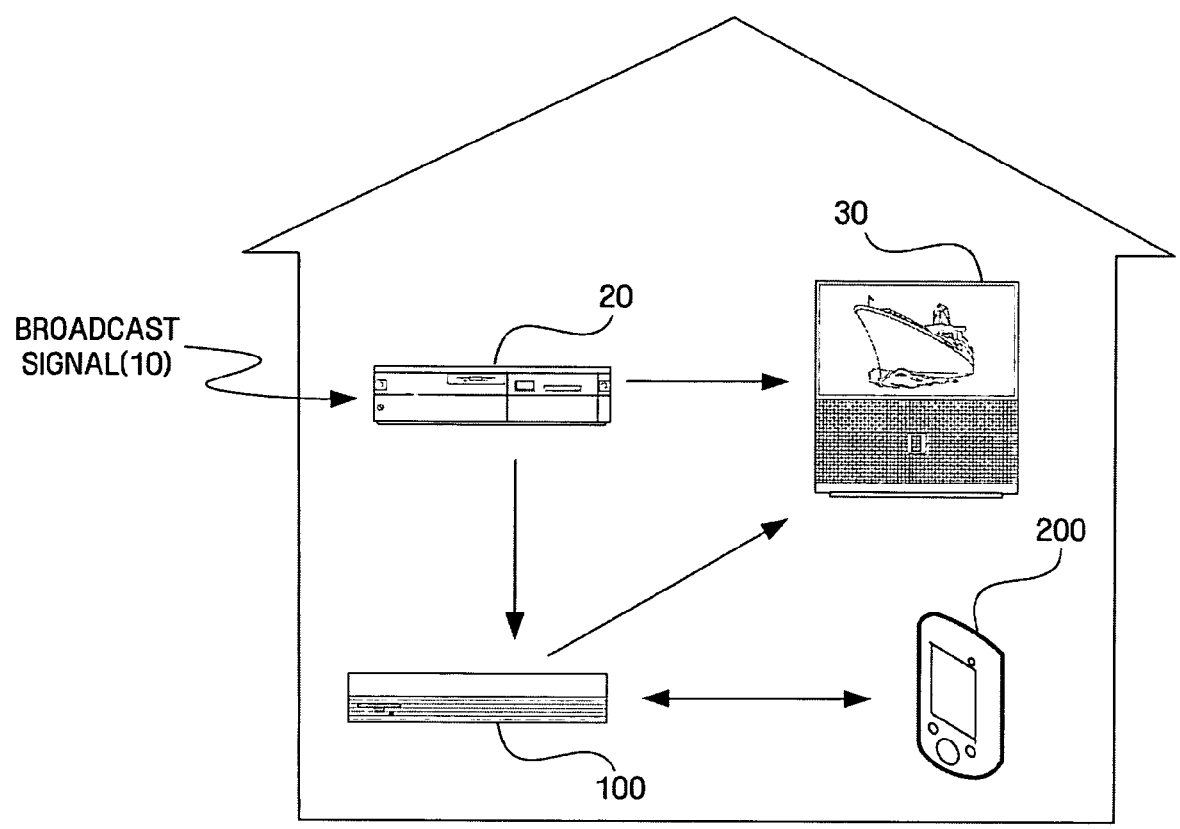
FIG. 1 shows a broadcast content synchronizing system according to an embodiment of the invention.

Advantages and features of the present invention and methods of accomplishing the same may be understood more readily by referring to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Thus, in some embodiments, well known methods, procedures, components, and circuits have not been described in detail so as not to unnecessarily obscure aspects of the present invention. Like reference numerals refer to like elements throughout the specification.

Hereinafter, embodiments according to the present invention will be described in detail with reference to the accompanying drawings.

FIG. 1 shows a broadcast content synchronizing system according to an embodiment of the invention.

The broadcast content synchronizing system includes a broadcast receiver 20, a broadcast output device 30, a broadcast recorder 100, and a portable content player 200.

The broadcast receiver 20 receives a broadcast signal 10 transmitted from a broadcast station and restores a broadcast content from the received broadcast signal. Broadcast contents used in the invention may be a series consisting of a plurality of episodes, for example, soap operas, a movie aired as a series, etc. Also, the broadcast content may be news, cultural programs, game shows, and so on that are regularly aired. Herein, a broadcast signal 10 can be transmitted by at least one of a ground wave, a satellite, a cable, and the Internet.

The broadcast receiver 20 can extract additional information such as an EPG (Electronic Program Guide) from the broadcast signal 10. The additional information includes information on details of a broadcast content such as genre, title, airtime, episode order, etc. The broadcast receiver 20 can be formed of, for example, a set-top box, a TV tuner card mounted in a PC, etc.

The broadcast output device 30 outputs broadcast contents restored by the broadcast receiver 20 or broadcast contents recorded by the broadcast recorder 100 to a user. In order to output broadcast contents, the broadcast output device 30 can include a loudspeaker outputting audio signals and a display outputting video signals. Such a broadcast output device 30 can be, for example, a digital TV set, a projector, a monitor, etc.

The broadcast recorder 100 records broadcast contents restored by the broadcast receiver 20. The broadcast recorder 100 can obtain additional information as well as the broadcast contents from the broadcast receiver 20.

The broadcast recorder 100 generates and manages metadata about the recorded broadcast contents. The metadata can include content information on broadcast contents and reproduction history information. The content information contains detail information on broadcast contents. The broadcast recorder 100 can extract the content information from the additional information obtained by the broadcast receiver 20. The reproduction history information indicates reproduction history regarding the broadcast contents, and is updated with the latest information when the broadcast recorder 100 reproduces the recorded broadcast contents or obtains metadata from the portable content player 200. The broadcast recorder 100 may be a PVR (Personal Video Recorder), a PC having a built-in TV tuner card, or the like.

In this embodiment, the broadcast receiver 20, the broadcast output device 30, and the broadcast recorder 100 are separate, but two or more of them can be combined into one unit.

The portable content player 200 has a storage medium in which broadcast contents can be stored, and can reproduce broadcast contents. The portable content player 200 manages metadata about broadcast contents stored therein. Such a portable content player 200 may be a PMP (Portable Multimedia Player), a PDA (Personal Digital Assistant), or the like.

When the broadcast recorder 100 is connected to the portable content player 200, it obtains the metadata from the portable content player 200 and synchronizes the obtained metadata to the metadata stored therein.

When the broadcast recorder 100 synchronizes the obtained metadata to the metadata stored therein, the reproduction history information is updated with the latest information. The broadcast recorder 100 confirms whether a broadcast content has been viewed or listened to by a user, and then automatically records, in the portable content player 200, a broadcast content corresponding to the next installment of the viewed or listened to broadcast content, or automatically sets a timer recording of the corresponding broadcast content.

The broadcast recorder 100 and the portable content player 200 will be described in more detail below.

Figure 2:
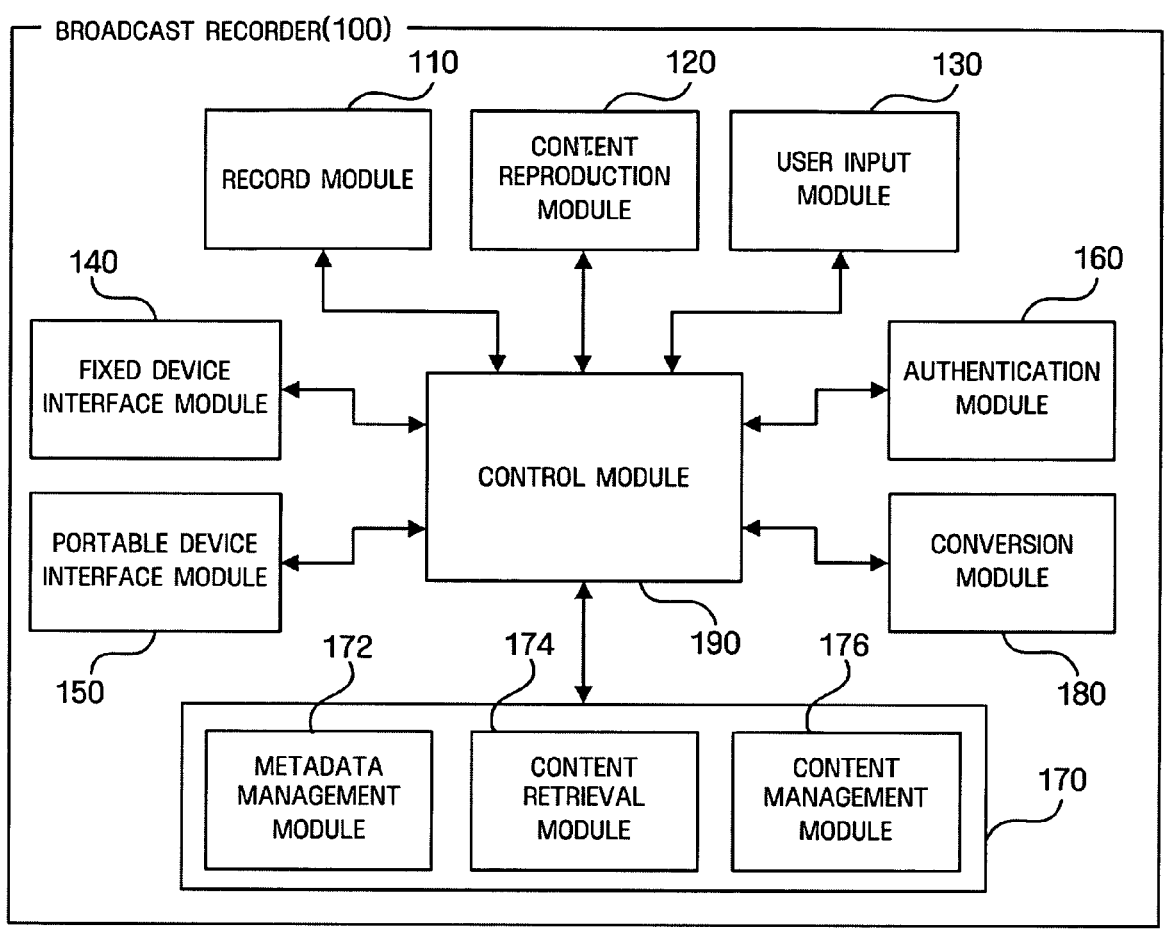
FIG. 2 is a block diagram showing a broadcast recorder according to an embodiment of the invention.

FIG. 2 is a block diagram showing a broadcast recorder according to an embodiment of the invention.

The broadcast recorder 100 shown in FIG. 2 includes a record module 110, a content reproduction module 120, a user input module 130, a fixed device interface module 140, a portable device interface module 150, an authentication module 160, a content synchronizing module 170, a conversion module 180, and a control module 190.

The record module 110 records broadcast contents received by the broadcast receiver 20. In order to record, the record module 110 can include a storage medium such as a hard disk or a flash memory. The broadcast contents recorded by the record module 110 can be compressed by using a predetermined video compression method, for example, MPEG-2, MPEC-4, etc.

The content reproduction module 120 reproduces the broadcast contents recorded by the record module 110. In order to reproduce the contents, the content reproduction module 120 can be realized according to a video decompression method corresponding to the video compression method used in the record module 110. When the content reproduction module 120 reproduces broadcast contents, it may check the latest reproduction position through the reproduction history information contained in the metadata about the broadcast contents to be reproduced and reproduce the broadcast contents from the checked latest reproduction position.

The user input module 130 receives control instructions from a user. In order to receive control instructions from a user, the user input module 130 can include an input unit such as a keypad or a touch screen. The user input module 130 can also include an infrared receiver for receiving control instructions of a user from a remote controller (not shown).

The fixed device interface module 140 communicates with the broadcast receiver 20 and the broadcast output device 30 by wire or wireless means. In particular, the fixed device interface module 140 receives broadcast contents and the additional information on the broadcast contents from the broadcast receiver 20 and transmits the broadcast contents reproduced by the content reproduction module 120. The fixed device interface module 140 can use security protocols such as HDCP (High-bandwidth Digital Content Protection) or DTCP (Digital Transmission Content Protection) so as to prevent piracy of the broadcast contents at the time of communication with the broadcast receiver 20 and the content transmitter 30. Further, the fixed device interface module 140 can provide a plurality of communication ports to connect to the broadcast receiver 20 and the content transmitter 30.

The portable device interface module 150 communicates with the portable content player 200. In order to communicate with the portable content player 200, the portable device interface module 150 can be connected to the portable content player 200 by wire or wireless means. When the portable device interface module 150 uses wire means in order to be connected to the portable content player 200, it can use wire communication protocols such as USB (Universal Serial Bus), IEEE (Institute of Electrical and Electronics Engineers) 1394, etc. When the portable device interface module 150 uses wireless means in order to be connected to the portable content player, it can use wireless communication protocols such as Bluetooth, WiFi, Wireless USB, Wireless IEEE 1394, etc. In addition, the portable device interface module 150 can communicate with the portable content player 200 through a data transmission relay device such as an access point. The portable device interface module 150 can use a device control protocol such as UpnP (Universal Plug and Play) to automatically detect the connection with the portable content player 200.

The authentication module 160 performs a predetermined authentication for the portable content player 200 that is connected thereto by the portable device interface module 150. For example, the authentication module 160 stores identification information (such as, for example, the product serial number or the MAC address of the portable content player) of the portable content player 200 that requests registration by the user input module 130. When a portable content player 200 is connected to the authentication module by the portable device interface module 150 and thereafter transmits identification information to the authentication module, the authentication module 160 compares the received identification information with the stored identification information. If the two pieces of identification information match, the portable content player 200 is identified as the correct device.

The content synchronizing module 170 performs content synchronization with the portable content player 200 which is authenticated by the authentication module 160. In order to perform the content synchronization, the content synchronizing module 170 includes a metadata management module 172, a content retrieval module 174, and a content management module 176.

The metadata management module 172 generates and manages metadata relating to broadcast contents recorded by the record module 110. In order to manage metadata, the metadata management module 172 extracts content information on the broadcast contents recorded by the record module 110 from the additional information obtained from the broadcast receiver 20, and generates metadata containing reproduction history information on the extracted content information and the broadcast contents.

The metadata management module 172 updates metadata about the broadcast content when the content reproduction module 120 reproduces the broadcast content. At the time of the metadata update, the reproduction history information of the metadata can be updated with the latest information. Further, the metadata management module 172 obtains metadata from the portable content player 200 and synchronizes the obtained metadata with the metadata managed by the metadata management module. At the time of metadata synchronization, the reproduction history information of the metadata managed by the metadata management module 172 can be updated with the latest information.

An embodiment of the metadata that the metadata management module 172 generates and manages is shown in FIG. 3 in a table form.

The content information 310 of the metadata shown in FIG. 3 contains the title 311 of the broadcast content, the total number of episodes 312 of the series related to the broadcast content, and the current episode order 313, the genre 314, the televised day of the week 315, the airdate 316, the airtime 317, etc. of the broadcast content. The content information 310 can further contain various details of the broadcast content such as a predetermined serial number that a broadcaster assigns to the series related to the broadcast content. The reproduction history information 320 contains the number of reproduction times 321 of the broadcast content, the latest reproduction date and time 322, the latest reproduction position 323 indicating where the broadcast content has been reproduced up to, etc. The reproduction history information 320 can further contain other information in addition to the exemplary information.

The reproduction history information 320 at the time when the metadata management module 172 generates the metadata can be set to predetermined initial values. For example, the number of reproduction times 321, the latest reproduction data and time 322, and the latest reproduction position 323 can be set to '0', '0000-00-00 AM 00:00:00', and '0x00000000', respectively.

Referring to FIG. 2 again, the content retrieval module 174 confirms, among the broadcast contents stored in the portable content player 200, a broadcast content that has already been reproduced, and retrieves a broadcast content corresponding to the next installment of the confirmed broadcast content from the broadcast contents recorded by the record module 110. The metadata can be used for retrieving the broadcast content.

The broadcast content that has already been reproduced among the broadcast contents stored in the portable content player 200 can be confirmed through the reproduction history information of the metadata obtained from the portable content player 200. For example, the content retrieval module 174 can determine that a broadcast content has already been reproduced in the following cases: a case when a threshold time has passed from the latest reproduction date and time, a case when the latest reproduction position is equal to or more than a threshold ratio of the total size of the broadcast content, or a case when the number of reproduction times is equal to or more than a threshold number of times. Alternatively, the content retrieval module can determine whether the broadcast content has already been reproduced on the basis of combinations of two or more items contained in the reproduction history information. The broadcast content that has already been reproduced can be interpreted as a broadcast content that the user has already viewed or listened to. However, since the latest reproduction position of a broadcast content that the user has already viewed or listened to will have a value approximate to the size of the broadcast content, it is preferable to determine whether a broadcast content has already been reproduced on the basis of the latest reproduction position.

In order to retrieve a broadcast content corresponding to the next installment of the reproduced broadcast content among the broadcast contents stored in the portable content player 200, the content retrieval module 174 can use the content information of the metadata. For example, the content retrieval module can distinguish broadcast contents of the same series on the basis of the title or the serial number contained in the content information of the metadata of the broadcast content confirmed to have already been reproduced, and a broadcast content corresponding to the next installment on the basis of the episode order, the airdate, etc.

The content management module 176 stores the broadcast content retrieved by the content retrieval module 174 in the portable content player 200. Then, the content management module 176 can store the metadata about the retrieved broadcast content in the portable content player 200 together with the retrieved broadcast content. If the broadcast content that the content retrieve module 174 retrieves does not exist, the content management module 176 sets a timer recording of the corresponding broadcast content.

Further, the content management module 176 can confirm broadcast contents that have already been reproduced among the broadcast contents stored in the portable content player 200 by using the metadata synchronized by the metadata management module 172, and delete the confirmed broadcast contents from the portable content player 200.

The conversion module 180 performs predetermined conversion on the broadcast content to be stored in the portable content player 200. For example, the conversion module 180 can reduce a file size of a broadcast content to be stored in the portable content player 200 by a threshold ratio. In order to reduce the file size, the conversion module can use scalable video coding schemes such as a FGC (Fine Granular Scalability) technique. As file sizes of broadcast contents decrease, more broadcast contents can be stored in the portable content player 200. In another embodiment, the conversion module 180 can convert a broadcast content to be stored in the portable content player 200 into a reproducible file format. For example, when the file format of a broadcast content recorded by the record module 100 has the extension 'mpg' and the extension of the file format of a broadcast content that the portable content player 200 can reproduce is 'avi', the conversion module 180 can convert the file format having the extension 'mpg' into a file having the extension 'avi'. The file format reproducible by the portable content player 200 can be obtained from the portable content player 200 when the portable content player 200 is connected to the portable device interface module 150, or can be obtained through information on the portable content player 200 that has been registered through the user input module 130 by the user. The file size reducing work or the file format converting work performed by the conversion module 180 can be carried out according to well known techniques, and thus the description thereof will be omitted.

The control module 190 controls the operation of the individual modules 110 to 180 constituting the broadcast recorder 100.

Figure 4:
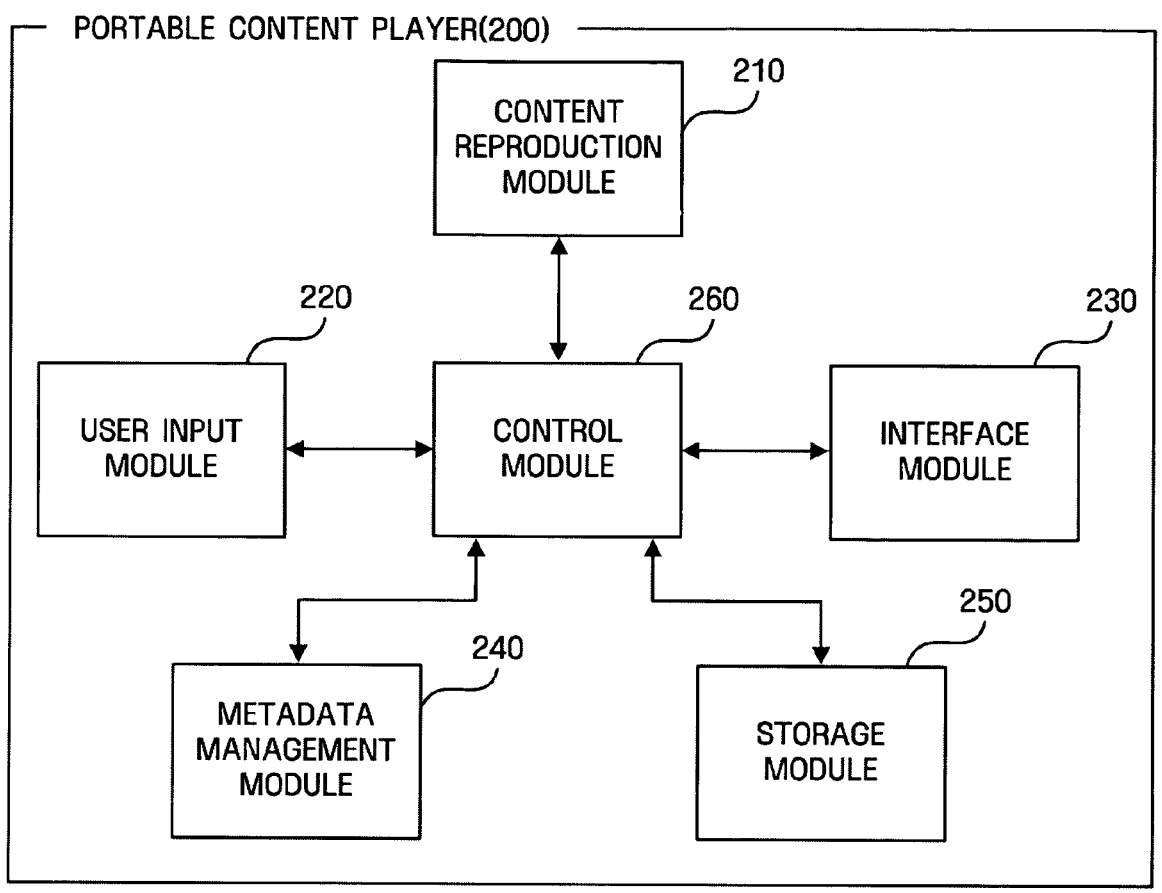
FIG. 4 is a block diagram showing a portable content player according to an embodiment of the invention.

FIG. 4 is a block diagram showing a portable content player according to an embodiment of the invention.

The portable content player 200 includes a content reproduction module 210, a user input module 220, an interface module 230, a metadata management module 240, a storage module 250, and a control module 260.

The content reproduction module 210 reproduces broadcast contents. The content reproduction module 210 can reproduce contents according to a video decompression method such as MPEG-2 (Moving Picture Experts Group-2), MPEG-4 (Moving Picture Experts Group-4), AVI (Audio Video Interleaving), etc. Further, the content reproduction module 210 can confirm the latest reproduction position through reproduction history information contained in the metadata of a broadcast content to be reproduced, and reproduce the broadcast content from the confirmed latest reproduction position.

The user input module 220 receives control instructions from the user. In order to receive control instructions, the user input module 220 can include an input unit such as a keypad or a touch screen.

The interface module 230 transmits data to the broadcast recorder 100 or receives data from the broadcast recorder 100. In order to transmit or receive data, the interface module 230 can be connected to the broadcast recorder 100 by wire or wireless means. Therefore, the interface module 230 can be realized through various communication protocols. For example, when the interface module 230 uses wire means in order to be connected to the broadcast recorder 100, it can use communication protocols such as USB (Universal Serial Bus), IEEE (Institute of Electrical and Electronics Engineers) 1394, etc. When the interface module 230 uses wireless means in order to be connected to the broadcast recorder, it can use communication protocols such as Bluetooth, WiFi, Wireless USB, Wireless IEEE 1394, etc. In addition, the interface module 230 can communicate with the broadcast recorder 100 through a data transmission relay device such as an access point.

The metadata management module 240 manages metadata received from the broadcast recorder 100. For example, when the content reproduction module 210 reproduces a broadcast content stored in the storage module 250, the metadata management module 240 updates the metadata of the broadcast content that is being reproduced. At this time, the reproduction history information of the metadata can be updated with the latest information. The metadata managed by the metadata management module 240 is the same as described with reference to FIG. 3.

The storage module 250 stores broadcast content and the metadata of the broadcast content. To enable storage, the storage module 250 includes a nonvolatile memory such as a flash memory that allows data to be read, written, and deleted.

The control module 260 controls the operation of the individual modules 210 to 250 constituting the portable content player 200. Further, when the interface module is connected to the broadcast recorder 100, the control module 260 transmits device information on the portable content player 200 to the broadcast recorder 100. The device information can contain function information and identification information on the portable content player 200. The function information can contain kinds of files (for example, video files having formats such as MPEG, AVI, and the like, audio files having formats such as MP3, MIDI, and the like, etc.) that the portable content player 200 can reproduce. The identification information can contain the product serial number, the MAC address, and so on of the portable content player 200.

In FIGS. 2 and 4, the term 'module' means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, the operation procedures of the broadcast recorder 100 and the portable content player 200 will be described in more detail with reference to FIGS. 5 and 9.

Figure 5:
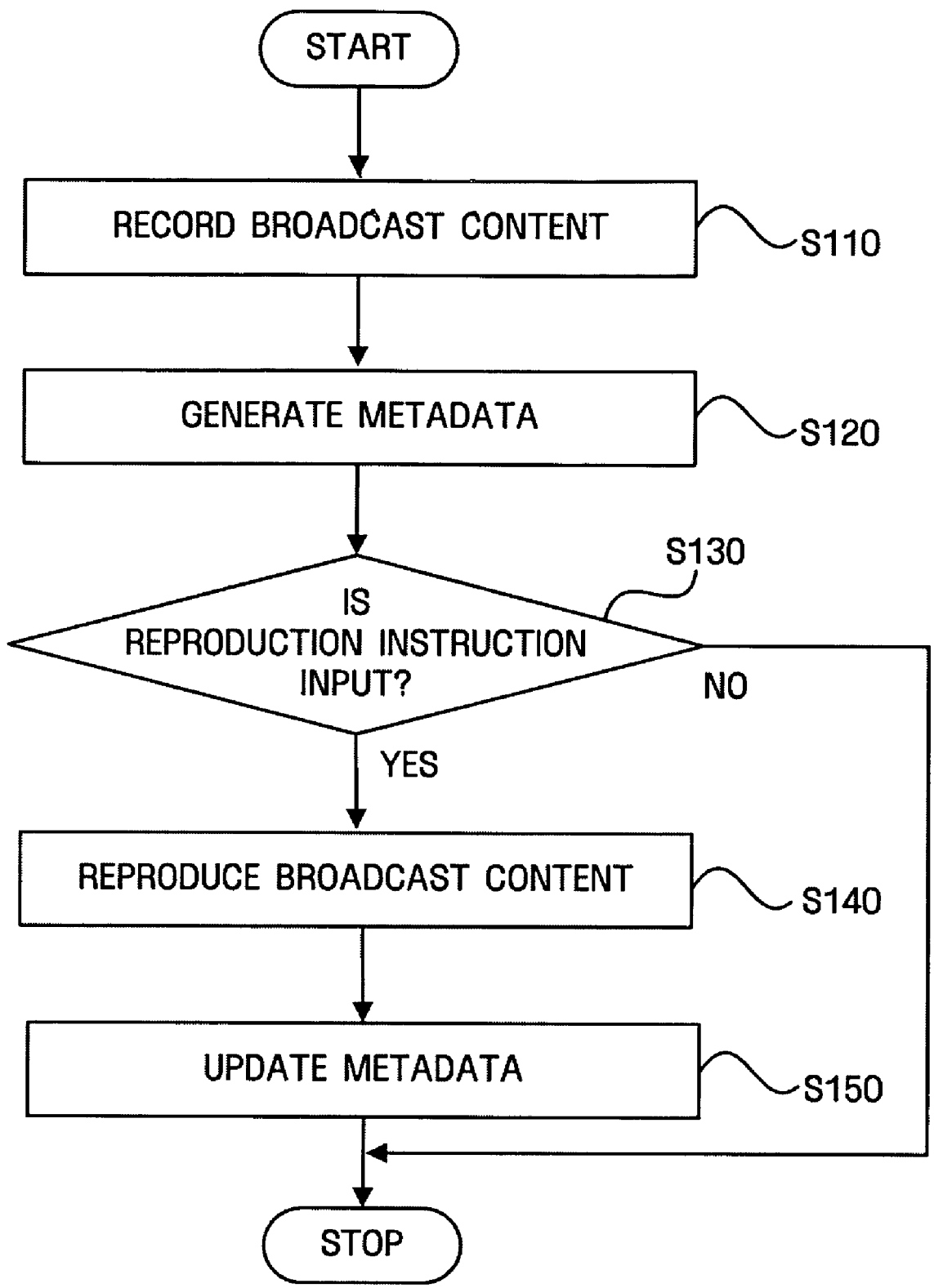
FIG. 5 is a flowchart showing metadata management processes of a broadcast recorder according to an embodiment of the invention.

FIG. 5 is a flowchart showing the metadata management procedures of the broadcast recorder according to an embodiment of the invention.

First, when a preset reservation time is reached or a broadcast record instruction is input from the user through the user input module 130, the record module 110 records the broadcast contents restored by the broadcast receiver 20 (S110).

When the record module 110 records the broadcast contents, the metadata management module 172 generates the metadata about the recorded broadcast contents (S120). At the time of metadata generation, the content information contained in the metadata can be extracted from the additional information on the recorded broadcast contents. Further, the reproduction history information contained in the metadata can be set to a predetermined initial value.

Next, when an instruction to reproduce a specific broadcast content of the recorded broadcast contents is input through the user interface module 130 (S130), the content reproduction module 120 reproduces the broadcast content (S140). At the time of reproduction, the content reproduction module 120 can confirm the latest reproduction position of the broadcast content through the metadata about the broadcast content subject to reproduction, and reproduce the broadcast content from the confirmed latest reproduction position.

When the content reproduction module 120 has reproduced the broadcast content, the metadata management module 172 updates the metadata about the broadcast content reproduced (S150). In particular, the reproduction history information contained in the metadata about the reproduced broadcast content is updated. For example, the number of reproduction times is counted, and the latest reproduction date and time and the latest reproduction position may be updated with the point of time and the reproduction position of the broadcast content when the reproduction of the broadcast content stops, respectively.

Figure 6:
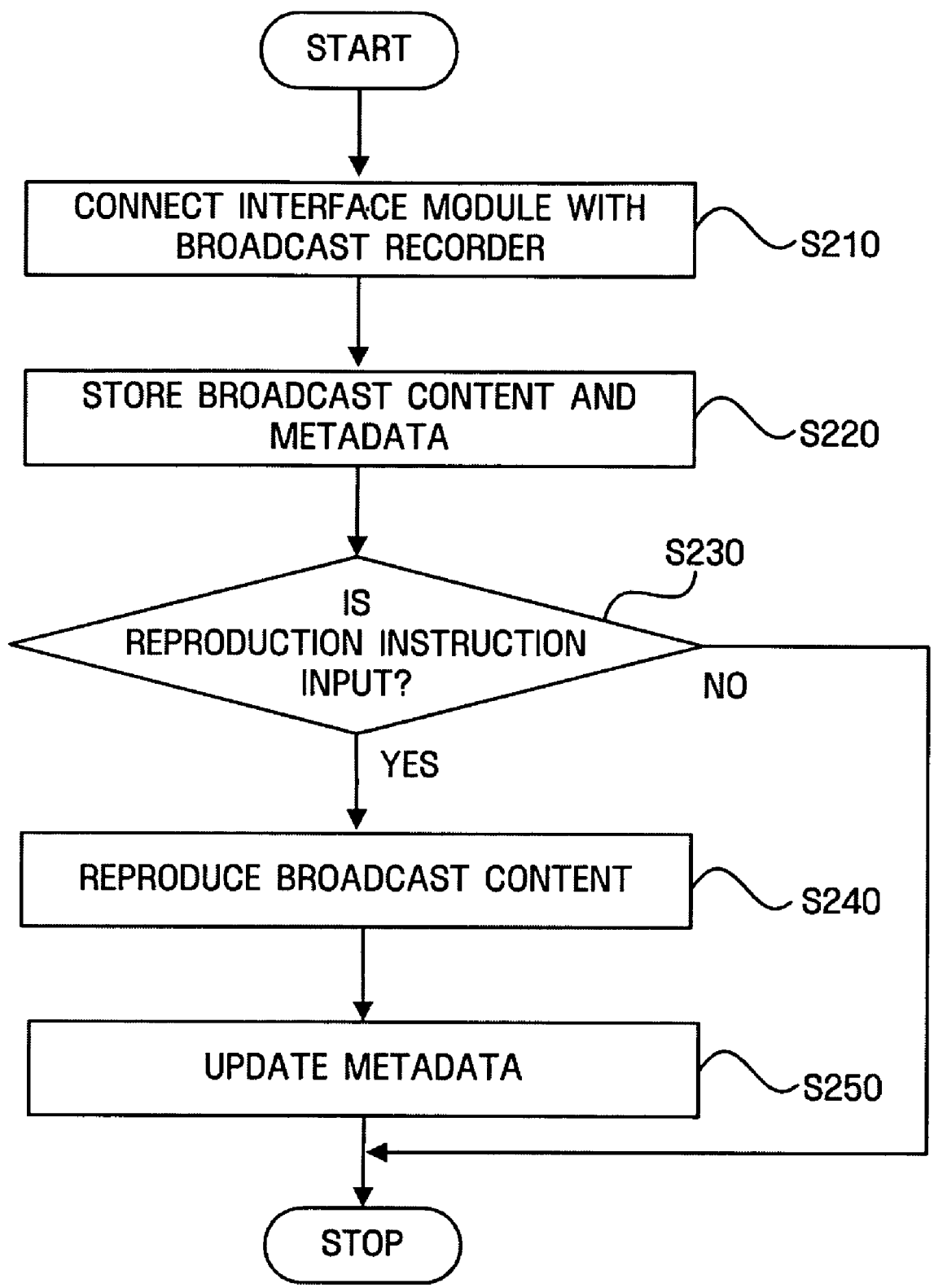
FIG. 6 is a flowchart showing metadata management processes of a portable content player according to an embodiment of the invention.

FIG. 6 is a flowchart showing the metadata management procedures of the portable content player according to an embodiment of the invention.

First, when the interface module 230 is connected to the broadcast recorder 100 (S210), the broadcast contents and the metadata are stored in the storage module 250 through the broadcast recorder 100. The operation of the broadcast recorder 100 for the storing will be described below with reference to FIG. 7.

Next, when an instruction to reproduce a specific broadcast content of the stored broadcast contents is input through the user input module 220 (S230), the content reproduction module 210 reproduces the broadcast content (S240). At the time of reproduction, the content reproduction module 210 can confirm the latest reproduction position of the broadcast content through the metadata about the broadcast content reproduction, and reproduce the broadcast content from the confirmed latest reproduction position.

When the content reproduction module 210 has reproduced the broadcast content, the metadata management module 240 updates the metadata about the broadcast content reproduced (S250). In particular, the reproduction history information contained in the metadata about the reproduced broadcast content is updated. For example, the number of reproduction times is counted, and the latest reproduction date and time and the latest reproduction position may be updated with the time and the reproduction position of the broadcast content when the reproduction of the broadcast content stops, respectively.

Figure 7:
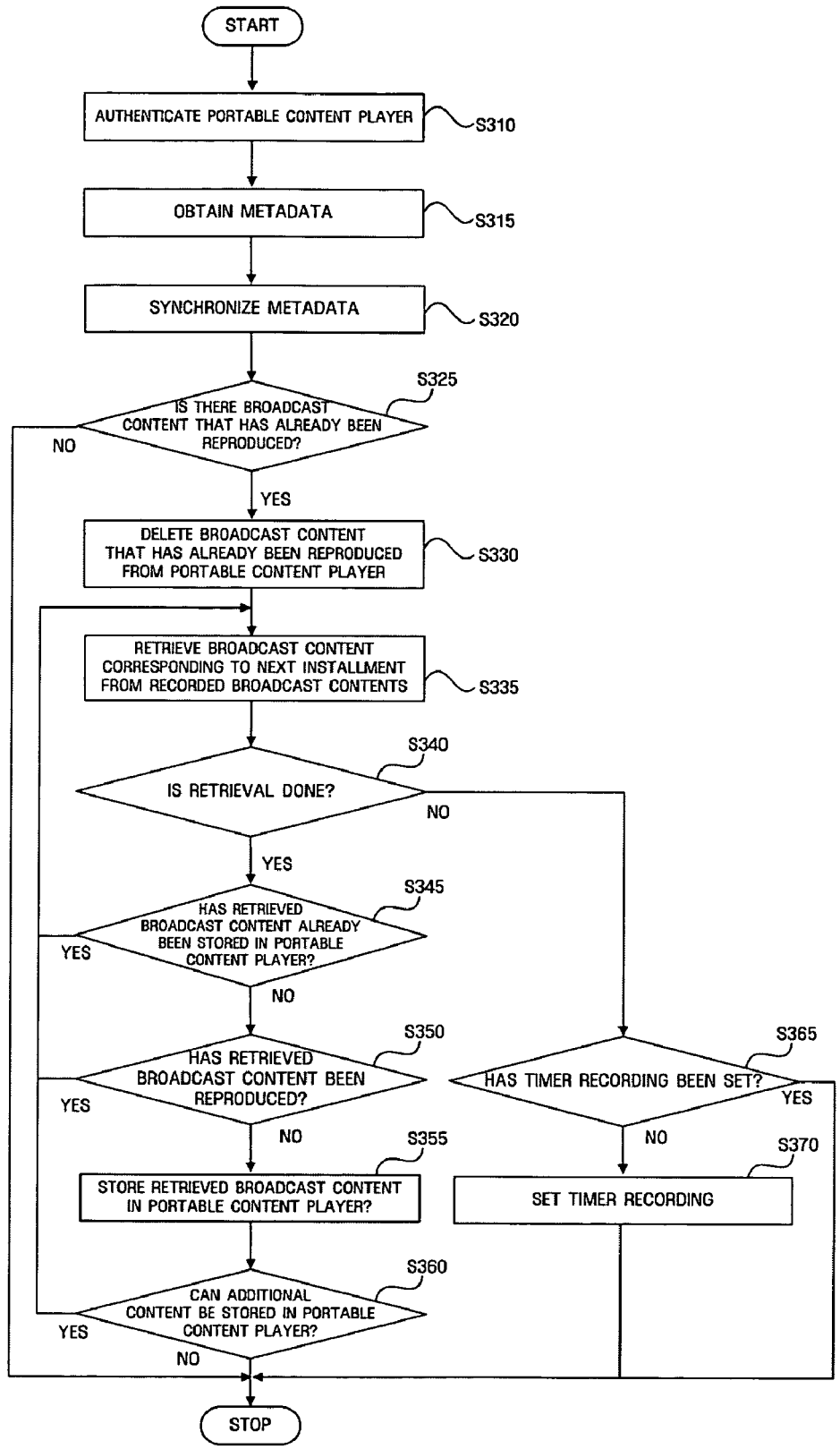
FIG. 7 is a flowchart showing a broadcast content synchronizing method according to an embodiment of the invention.

FIG. 7 is a flowchart showing a broadcast content synchronizing method according to an embodiment of the invention.

First, when connected to the portable content player 200 through a portable device interface module 150, the authentication module 160 performs authentication work for the portable content player 200 (S310). The authentication procedure will be described below with reference to FIG. 8.

When the authentication for the portable content player 200 is completed, the metadata management module 172 obtains the metadata from the portable content player 200 (S315). As described above, the metadata obtained from the portable content player 200 includes the content information and the reproduction history information on the broadcast contents stored in the portable content player 200.

Next, the metadata management module 172 synchronizes the obtained metadata with the metadata managed by the metadata management module (S320). At the time of metadata synchronization, the reproduction history information of the metadata managed by the metadata management module 172 can be updated with the latest information.

For example, assuming that the metadata of a broadcast content 'A' is 'metadata M', the latest reproduction data and time of the reproduction history information of the metadata M stored in the broadcast recorder 100 is Sep. 12, 2005 10:10 AM, and the latest reproduction data and time of the reproduction history information of the metadata M stored in the portable content player 200 is Sep. 13, 2005 3:40 PM, the synchronization process is performed by using the metadata M stored in the portable content player 200 as a standard.

Next, the content retrieval module 174 confirms broadcast contents that have already been reproduced among the broadcast contents stored in the portable content player 200 through the metadata obtained from the portable content player 200 (S325).

Then, the content management module 176 can delete the broadcasts contents confirmed to have already been reproduced from the portable content player 200 (S330).

The content retrieval module 174 retrieves a broadcast content corresponding to the next installment of the broadcast content confirmed to have already been reproduced from the broadcast contents recorded by the record module 110 (S335). The metadata can be used for retrieving the broadcast content corresponding to the next installment. For example, broadcast contents of the same series can be distinguished by the titles, the serial numbers, or the like of the content information and the order of the broadcast contents can be distinguished by the episode orders, the airdates, or the like.

When there is broadcast content that the content retrieval module retrieves (S340), the content retrieval module 174 determines whether the retrieved broadcast content has already been stored in the portable content player 200 and whether the retrieved broadcast content has already been reproduced (S345, S350). Whether the retrieved broadcast content has already been stored in the portable content player 200 can be confirmed through the content information of the metadata obtained from the portable content player 200. Whether the retrieved broadcast content has already been reproduced can be confirmed through the Teproduction history information of the synchronized metadata.

If the retrieved broadcast content has already been stored in the portable content player 200 or has already been reproduced, the content retrieval module 174 retrieves the broadcast content corresponding to the next installment of the retrieved broadcast content (S335).

However, when it is determined in the processes S345 and S350 that the retrieved broadcast content has not been stored in the portable content player 200 and has not already been reproduced, the content management module 176 stores the retrieved broadcast content in the portable content player 200 (S355). At this time, the content management module 176 can store the metadata about the retrieved broadcast content together with the retrieved broadcast content in the portable content player 200. Further, a procedure in which the conversion module 180 reduces the size of the broadcast content to a threshold ratio can be added. In this case, the content management module 176 stores the broadcast content having the reduced file size in the portable content player 200.

Next, the content management module 176 determines whether broadcast contents can be additionally stored in the portable content player 200 (S360). A standard for the determination may be whether the portable content player 200 has any extra storage space where broadcast contents can be stored or whether broadcast contents have been stored in the portable content player 200 the threshold number of times that the user has preset by the user input module 130.

According to the determination standard, when the portable content player 200 does not have any extra storage space or broadcast contents have not been stored in the portable content player 200 the threshold number of times, the content retrieval module 174 can retrieve the broadcast content corresponding to the next installment of the broadcast content stored in the process S355 (S335).

As described above, it is possible to automatically store, in the portable content player 200, a plurality of broadcast contents that the user has not viewed or listened to.

Meanwhile, when it is determined in the process S340 that the content retrieve module 174 is not retrieving broadcast content, the content management module 176 confirms whether a timer recording of the corresponding broadcast content has been set (S365). If a timer recording has not been set, the content management module sets a timer recording of the corresponding broadcast content (S370). Information on the airdate, the airtime, the televise channel, and so on required to set the timer recording can be known through the additional information obtained from the broadcast receiver 20.

Figure 8:
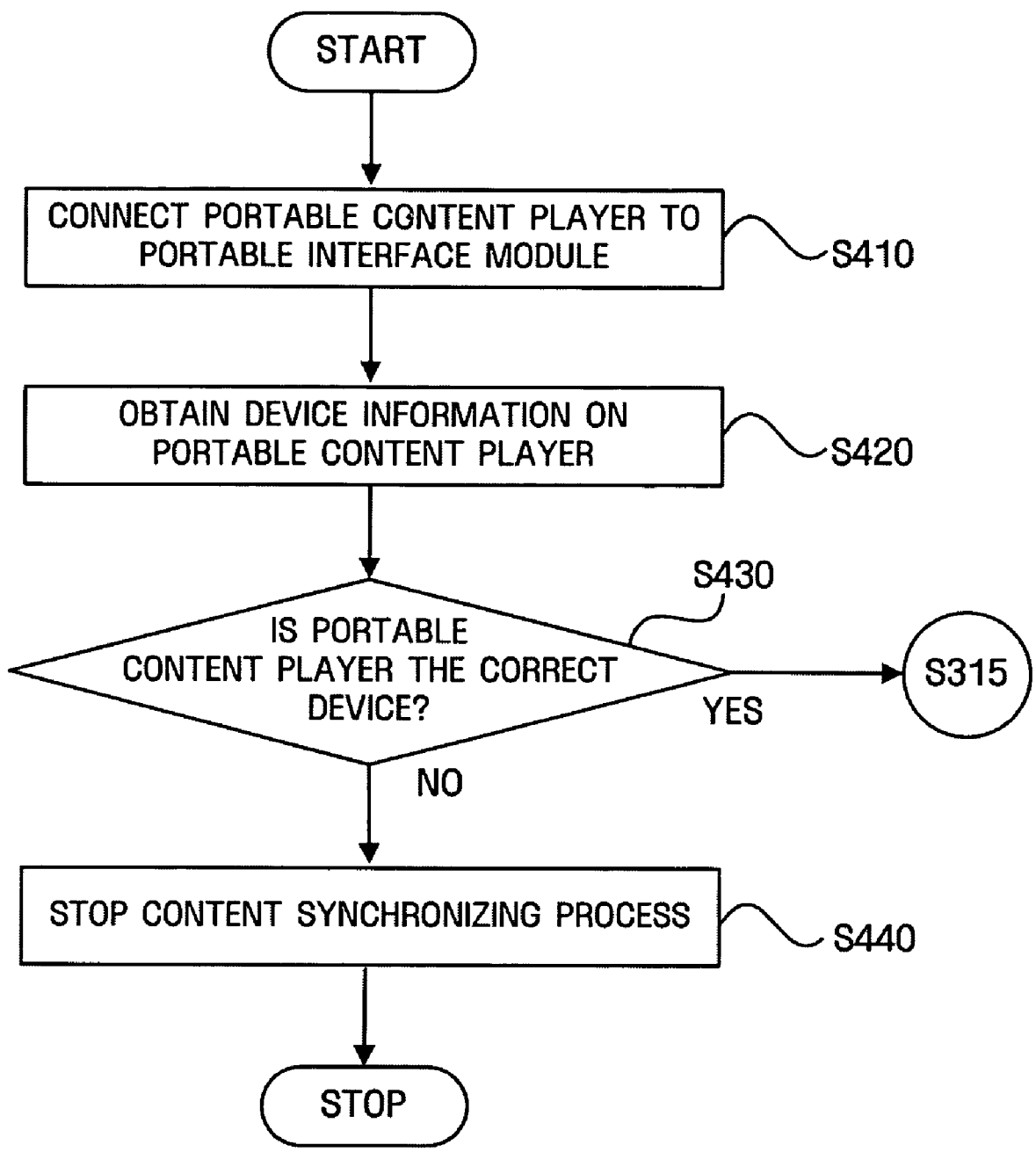
FIG. 8 is a flowchart specifically showing the process S310 of authenticating a portable content player in FIG. 7.

FIG. 8 is a flowchart specifically showing the process S310 of authenticating the portable content player in FIG. 7.

First, when the portable content player 200 is connected to the portable device interface module 150, the authentication module 160 obtains the device information on the portable content player 200 from the portable content player 200 (S420). The device information can contain the function information, the identification information, and so on of the portable content player 200.

The authentication module 160 determines, through the device information obtained from the portable content player 200, whether the portable content player 200 is a correct device to perform the content synchronizing procedure described with reference to FIG. 7 (S430). Standards for the determination of the process S430 may be whether the portable content player 200 can reproduce broadcast contents, whether the portable content player 200 has been registered by the user, and the like.

When the portable content player 200 is determined to be the correct device, the process S315 and the subsequent processes shown in FIG. 7 can be performed. However, when the portable content player 200 is determined not to be the correct device, the control module 190 stops the content synchronizing work with the portable content player 200 (S440).

FIG. 9 is a flowchart specifically showing the process S355 of storing broadcast contents in the portable content player in FIG. 7.

The conversion module 180 confirms whether the broadcast content retrieved in the process S335 has a file format that the portable content player 200 can reproduce (S510). File formats that the portable content player can reproduce can be known through the device information obtained in the process S420 of FIG. 8 or information preset by the user.

If the retrieved broadcast content does not have a file format that the portable content player 200 can reproduce, the conversion module 180 converts the retrieved broadcast content into a file format that the portable content player 200 can reproduce (S520).

Next, the content management module 176 stores the converted broadcast content in the portable content player 200 (S530).

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

The broadcast content synchronizing method and apparatus between the broadcast recorder and the portable content player of the invention as described above may have one or more following effects.

First, it is possible to automatically store broadcast contents of a series in the portable content player.

Second, it is possible to automatically set a timer recording of broadcast contents of a series.

What is claimed is:

1. A broadcast content synchronizing method comprising:
   obtaining metadata about broadcast contents stored in a portable content player from the portable content player;
   confirming a broadcast content that has already been reproduced among the broadcast contents stored in the portable content player using the obtained metadata;
   retrieving a broadcast content corresponding to a next installment of the confirmed broadcast content from recorded broadcast contents;
   storing the retrieved broadcast content in the portable content player;
   setting a timer recording of the broadcast content corresponding to the next installment when the broadcast content corresponding to the next installment is not a result of the retrieval; and
   automatically recording the broadcast content corresponding to the next installment without human interaction when the broadcast content corresponding to the next installment is not a result of the retrieval.

2. The broadcast content synchronizing method of claim 1, wherein the metadata comprises content information and reproduction history information that represent the details and the reproduction history of the broadcast contents.

3. The broadcast content synchronizing method of claim 2, wherein the content information contains at least one of a title, a total number of episodes of a series related to the broadcast content, a current episode order, a genre, a televised day of the week, an airdate, an airtime of the broadcast content, and a serial number to distinguish the series related to the broadcast content, and
the reproduction history information contains at least one of the number of reproduction times, the latest reproduction data and time, and the latest reproduction position.

4. The broadcast content synchronizing method of claim 1, further comprising storing the metadata about the broadcast contents stored in the portable content player.

5. The broadcast content synchronizing method of claim 1, wherein the storing includes:
   converting the retrieved broadcast content into a file format that the portable content player can reproduce; and
   storing the converted broadcast content in the portable content player.

6. The broadcast content synchronizing method of claim 1, wherein the storing includes:
   reducing a file size of the retrieved broadcast content by a threshold ratio; and
   storing the broadcast content having the reduced file size in the portable content player.

7. The broadcast content synchronizing method of claim 1, further comprising deleting the confirmed broadcast content that has already been reproduced from the portable content player.

8. The broadcast content synchronizing method of claim 1, further comprising synchronizing the obtained metadata with metadata stored in advance.

9. The broadcast content synchronizing method of claim 8, further comprising determining, by using the synchronized metadata and the obtained metadata, whether the retrieved broadcast content has already been stored in the portable content player,
wherein the storing is performed when it is determined that the retrieved broadcast content has not already been stored in the portable content player.

10. The broadcast content synchronizing method of claim 8, further comprising determining, by using the synchronized metadata, whether the retrieved broadcast content has already been reproduced,
wherein the storing is performed when it is determined that the retrieved broadcast content has not already been reproduced.

11. The broadcast content synchronizing method of claim 10, wherein the retrieving a broadcast content corresponding to the next installment of the retrieved broadcast content is performed when it is determined that the retrieved broadcast content has already been reproduced.

12. The broadcast content synchronizing method of claim 1, wherein the next installment of the confirmed broadcast content is based on an order of an episode or series of the broadcast content.

13. A broadcast recorder comprising:
a broadcast record module which records broadcast contents;
an interface module which communicates with a portable content player; and
a content synchronizing module which retrieves, from the recorded broadcast contents, a broadcast content corresponding to a next installment of a broadcast content that has already been reproduced among broadcast contents stored in the portable content player, and stores the retrieved broadcast content in the portable content player,
wherein the broadcast record module, the interface module, and the content synchronizing module are implemented as hardware, and
wherein the content synchronizing module sets a timer recording of the broadcast content corresponding to the next installment when the broadcast content corresponding to the next installment is not a result of the retrieval,
wherein the broadcast record module automatically records the broadcast content corresponding to the next installment without human interaction when the broadcast content corresponding to the next installment is not a result of the retrieval.

14. The broadcast recorder of claim 13, wherein the content synchronizing module includes:
a metadata management module, implemented as hardware, that obtains metadata about the broadcast contents stored in the portable content player from the portable content player and synchronizes the obtained metadata with metadata stored in advance;
a content retrieval module, implemented as hardware, that confirms, by using the metadata obtained from the portable content player and the synchronized metadata, the broadcast content that has already been reproduced among the broadcast contents stored in the portable content player, and retrieves the broadcast content corresponding to the next installment of the confirmed broadcast content from the recorded broadcast contents; and
a content management module, implemented as hardware, which stores the broadcast content retrieved by the content retrieval module in the portable content player.

15. The broadcast recorder of claim 14, wherein the content management module deletes, from the portable content player, the broadcast content that the content retrieval module confirmed to have already been reproduced.

16. The broadcast recorder of claim 14, wherein the metadata contains content information and reproduction history information that represent details and reproduction history of the broadcast contents.

17. The broadcast recorder of claim 16,
wherein the content information contains at least one of a title, a total number of episodes of a series related to the broadcast content, a current episode order, a genre, a televised day of the week, an airdate, an airtime of the broadcast content, and a serial number to distinguish the series related to the broadcast content, and
the reproduction history information contains at least one of the number of reproduction times, the latest reproduction data and time, and the latest reproduction position.

18. The broadcast recorder of claim 13, further comprising a conversion module, implemented as hardware, which converts the broadcast content subject to be stored in the portable content player into a file format that the portable content player can reproduce.

19. The broadcast recorder of claim 13, further comprising a conversion module, implemented as hardware, that reduces a file size of the broadcast content subject to be stored in the portable content player by a threshold ratio.

20. The broadcast recorder of claim 13, wherein the next installment of the broadcast content is based on an order of an episode or series of the broadcast content.

* * * * *